(12) United States Patent
Pirkle et al.

(10) Patent No.: US 7,516,692 B2
(45) Date of Patent: Apr. 14, 2009

(54) METHOD AND APPARATUS FOR SLOW COOKING

(75) Inventors: Fred L. Pirkle, Abington, PA (US); Damian Coccio, Norristown, PA (US)

(73) Assignee: Therm-Omega-Tech, Inc., Warminster, PA (US)

( * ) Notice: Subject to any disclaimer, the term of this patent is extended or adjusted under 35 U.S.C. 154(b) by 748 days.

(21) Appl. No.: 10/781,174

(22) Filed: Feb. 18, 2004

(65) Prior Publication Data

US 2004/0226454 A1 Nov. 18, 2004

Related U.S. Application Data

(60) Provisional application No. 60/448,196, filed on Feb. 18, 2003.

(51) Int. Cl.
*A47J 37/07* (2006.01)
(52) U.S. Cl. .............................. 99/333; 99/337; 99/468; 99/476; 99/481
(58) Field of Classification Search ....... 99/326–329 R, 99/331–333, 337–338, 450, 468, 473, 476, 99/482, 481; 126/274, 271.3
See application file for complete search history.

(56) References Cited

U.S. PATENT DOCUMENTS

| | | | |
|---|---|---|---|
| 2,211,940 A | | 8/1940 | Stoner |
| 2,914,644 A | * | 11/1959 | Holtkamp .................... 219/413 |
| 2,968,301 A | | 1/1961 | Cowart |
| 3,573,431 A | | 4/1971 | Tyler et al. |
| 3,589,269 A | | 6/1971 | Weir, Sr. et al. |
| 3,697,198 A | * | 10/1972 | Holder, Jr. ................... 417/411 |
| 3,800,123 A | * | 3/1974 | Maahs .......................... 219/407 |
| 3,868,943 A | * | 3/1975 | Hottenroth et al. .......... 126/25 R |
| 3,933,145 A | | 1/1976 | Reich |
| 3,982,522 A | | 9/1976 | Hottenroth et al. |
| 4,035,787 A | | 7/1977 | Hornung |
| 4,054,778 A | * | 10/1977 | Wollich ....................... 219/413 |
| 4,209,006 A | | 6/1980 | Marsalko |
| 4,287,870 A | | 9/1981 | Johnson |
| 4,301,509 A | | 11/1981 | Haase et al. |
| 4,418,615 A | | 12/1983 | Higgins |
| 4,475,529 A | * | 10/1984 | Milligan ....................... 126/77 |
| 4,492,336 A | | 1/1985 | Takata et al. |
| 4,510,854 A | * | 4/1985 | Robertson ..................... 99/337 |
| 4,516,561 A | * | 5/1985 | Stawski et al. ............. 126/25 B |
| 4,601,004 A | | 7/1986 | Holt et al. |
| 4,658,710 A | | 4/1987 | Quet et al. |
| 4,700,052 A | | 10/1987 | Wolf et al. |
| 4,773,319 A | | 9/1988 | Holland |
| 4,800,865 A | | 1/1989 | Setzer |
| 4,823,684 A | | 4/1989 | Traeger et al. |
| 4,828,166 A | | 5/1989 | Wolf et al. |
| 4,867,050 A | * | 9/1989 | Patenaude et al. ............ 99/400 |
| 4,934,260 A | * | 6/1990 | Blevins ........................ 99/482 |

(Continued)

*Primary Examiner*—Drew E Becker
(74) *Attorney, Agent, or Firm*—Howson & Howson LLP

(57) ABSTRACT

Slow cooking over solid fuel in an enclosed barbeque pit is carried out by the use of an electronically controlled impeller which directs a flow of air toward the fuel. The duty cycle of the impeller is controlled by an electronic controller which is responsive to the internal temperature of the food and to the temperature of the pit atmosphere. As the internal temperature of the food increases, the temperature of the pit atmosphere gradually decreases.

16 Claims, 5 Drawing Sheets

U.S. PATENT DOCUMENTS

| | | | |
|---|---|---|---|
| 4,962,299 A | 10/1990 | Duborper et al. | |
| 5,000,085 A | 3/1991 | Archer | |
| 5,044,262 A * | 9/1991 | Burkett et al. | 99/327 |
| 5,096,116 A | 3/1992 | Akamatu et al. | |
| 5,154,159 A | 10/1992 | Knafelc et al. | |
| 5,168,860 A * | 12/1992 | Kibourian | 126/25 R |
| 5,310,110 A | 5/1994 | Akamatsu et al. | |
| 5,996,572 A | 12/1999 | Ilagan | |
| 6,615,820 B1 * | 9/2003 | Ferreira et al. | 126/25 B |
| 2002/0033100 A1 * | 3/2002 | Sada et al. | 99/331 |

\* cited by examiner

METHOD AND APPARATUS FOR SLOW COOKING

CROSS-REFERENCE TO RELATED APPLICATIONS

This application claims the benefit of U.S. Provisional Patent Application Ser. No. 60/448,196, filed Feb. 18, 2003.

FIELD OF THE INVENTION

This invention relates generally to cooking, and more specifically to a method and apparatus for carrying out slow cooking of foods such as meat, using solid fuel.

BACKGROUND OF THE INVENTION

Much outdoor cooking over charcoal is conventional grilling in which meat, such as ground beef patties, steaks, chicken parts, and pork chops, or fish are placed on a grill directly over hot, glowing charcoal. Satisfactory cooking of ground beef patties, relatively thin cuts of meat, and fish can be carried out in this manner, at relatively high temperatures, in a few minutes to about one-half an hour.

Larger cuts of meat, such as beef briskets, pork shoulders, as well as whole chickens and the like, require much longer cooking times, sometimes up to twelve hours or more, depending on a number of factors, including the kind of meat being cooked, the size and weight of the portion being cooked, and its collagen content. Slow cooking of these meats breaks down collagen, making the meat tender, and easy to cut and chew. Because of the long cooking times, cooking must be carried out at relative low temperatures in order to avoid charring and dehydration.

Smokers are used for outdoor cooking of these larger cuts of meat. Most smokers fall into either of two categories. One popular type of smoker is typically in the form of a cylindrical or egg-shaped enclosure symmetrical about a vertical axis. In this type of smoker a charcoal or wood fire is directly underneath the meat rack, but vertically spaced from the meat rack by a large distance, usually with a drip pan interposed between the fire and the meat rack. Hot gas from the fire passes around the edge of the pan and into contact with the meat on the meat rack, and then out through a vent or chimney at the top. Another type of smoker has a cylindrical drum-shaped cooking chamber generally symmetrical about a horizontal axis, and a separate fire box attached to one end of the drum. Smoke from the firebox is directed into the cooking chamber, and, from the cooking chamber through a stack located near the opposite end of the cooking chamber. In the operation of both types of smokers, the temperature within the cooking chamber is controlled by manual adjustment of air dampers.

Indirect heating of larger cuts of meat can also be carried out in a conventional kettle grill, or a drum-type grill, by arranging the charcoal so that it is not directly underneath the meat, and adjusting the air dampers, both below the charcoal and above the meat, in such a way as to avoid excessive temperature.

In smokers, and also in kettle grills, it is difficult to maintain a steady, moderate temperature. Depending on conditions, the temperature in the smoker or grill will gradually rise or fall. Controlling the temperature, therefore, requires frequent adjustment of the dampers. If the fire becomes too hot, the meat will be cooked too quickly on the outside and inadequately on the inside. Moreover, if the fire is excessively hot, it will burn too quickly, requiring frequent addition of fuel. Excessive temperature can be avoided by using only a small amount of fuel. However, when a smaller amount of fuel is used, more frequent addition of fuel is required. On the other hand, if the dampers are insufficiently open to maintain combustion, the fire will be extinguished, and must be reignited. In either case, whenever the smoker or grill is opened to add or reignite fuel, the atmosphere inside the cooking chamber cools, and the proper cooking temperature must be reestablished.

Another problem encountered in conventional slow cooking is the excessive consumption of fuel. In order to establish a good charcoal fire, the usual practice is to ignite a quantity of charcoal, using lighter fluid, an electric heater, or a propane torch, or to place the charcoal temporarily in a removable chimney, and ignite it by burning paper. When these methods are used, the entire quantity of charcoal is ignited, and before cooking is begun, the charcoal is brought to a condition in which the coals are glowing, with little or no visible flame. A large amount of heat, and consequently a large amount of fuel, is wasted in the process of establishing a fire. The fact that the entire mass of charcoal is ignited initially, also means that it will be necessary to replenish the fuel supply from time to time, if cooking is to take place over a long interval.

An object of this invention is to make it possible to cook slowly with a solid fuel fire over a long time interval, without the need for constant attention to the fire. Another object of the invention is to conserve solid fuel, and to minimize or avoid the need for replenishment of fuel in slow cooking.

BRIEF SUMMARY OF THE INVENTION

For the purpose of the following description, the enclosure will be referred to as a "barbeque pit," or "pit" which term should be understood as encompassing any enclosed, solid-fuel, cooking apparatus in which the food is exposed to the gaseous combustion product of the fuel, including, but not limited to, charcoal kettle grills, drum-type grills, and enclosed grills having any of various other shapes, as well as the various types of smokers.

The cooking apparatus in accordance with the invention comprises an enclosure having a food support and a solid fuel support, an impeller arranged to cause air to impinge upon solid fuel on said solid fuel support, a first temperature sensor for sensing the temperature of the atmosphere within the enclosure in the vicinity of an article of food on the food support, a second temperature sensor for sensing the internal temperature of a food article on the food support, and a controller, responsive to the temperature sensors, for operating the impeller. The controller causes air to flow toward the solid fuel to maintain the temperature of said atmosphere within the enclosure substantially at a set point determined by the internal temperature sensed by said second temperature sensor, and reduces the set point as the internal temperature increases.

In a preferred embodiment of the cooking apparatus the controller includes a first adjuster for setting a target temperature for the internal temperature of the food article, and reduces the set point temperature gradually toward a level exceeding the target temperature by a predetermined amount. The controller also includes a second adjuster for setting a maximum temperature for the atmosphere within the enclosure.

Preferably, the apparatus includes a deflector for directing a stream of air from the impeller along the internal wall of the enclosure toward the fuel supporting area so that the stream of air is prevented from reaching the first temperature sensor before it reaches fuel on the fuel supporting area.

The controller preferably controls the flow of air by alternately switching electrical power to an electric motor on and off, and causes the impeller to increase and decrease the flow of air by varying the duty cycle of the electric motor.

The controller establishes sequentially repeating fixed intervals of time, and alternately switches electrical power to said electric motor on once and off once in each such fixed interval of time, and causes the impeller to increase and decrease the flow of air by varying the proportion of each such fixed interval of time during which electrical power to the electric motor is switched on.

The enclosure is preferably substantially free of openings providing paths for convective flow of external air to the fuel supporting area, so that the air supply to the fuel is controlled by the impeller.

The invention also resides in a method of cooking comprising burning solid fuel inside an enclosure which also contains the food to be cooked, sensing an internal temperature in the food, sensing a temperature of a gaseous atmosphere within the enclosure in the vicinity of the food, causing air to flow from the exterior of the enclosure into the interior of the enclosure and toward the solid fuel by means of an impeller, and directing the air so that it reaches the vicinity of the solid fuel before its temperature is sensed in the gaseous atmosphere temperature sensing step. In response to the sensed internal temperature of the food and the sensed temperature of the gaseous atmosphere, air is caused to flow toward the solid fuel to maintain the temperature of the atmosphere within said enclosure substantially at a set point determined by the internal temperature, and reducing the set point as the internal temperature increases.

The cooking apparatus and method make it possible to carry out cooking over solid fuel over a very long time, without the need for continuous attention by the cook, and conserve fuel, making it possible to cook over a long time interval without fuel replenishment.

Other objects, details and advantages of the invention will be apparent from the following detailed description when read in conjunction with the drawings.

DETAILED DESCRIPTION OF THE PREFERRED EMBODIMENT

Figure 1:
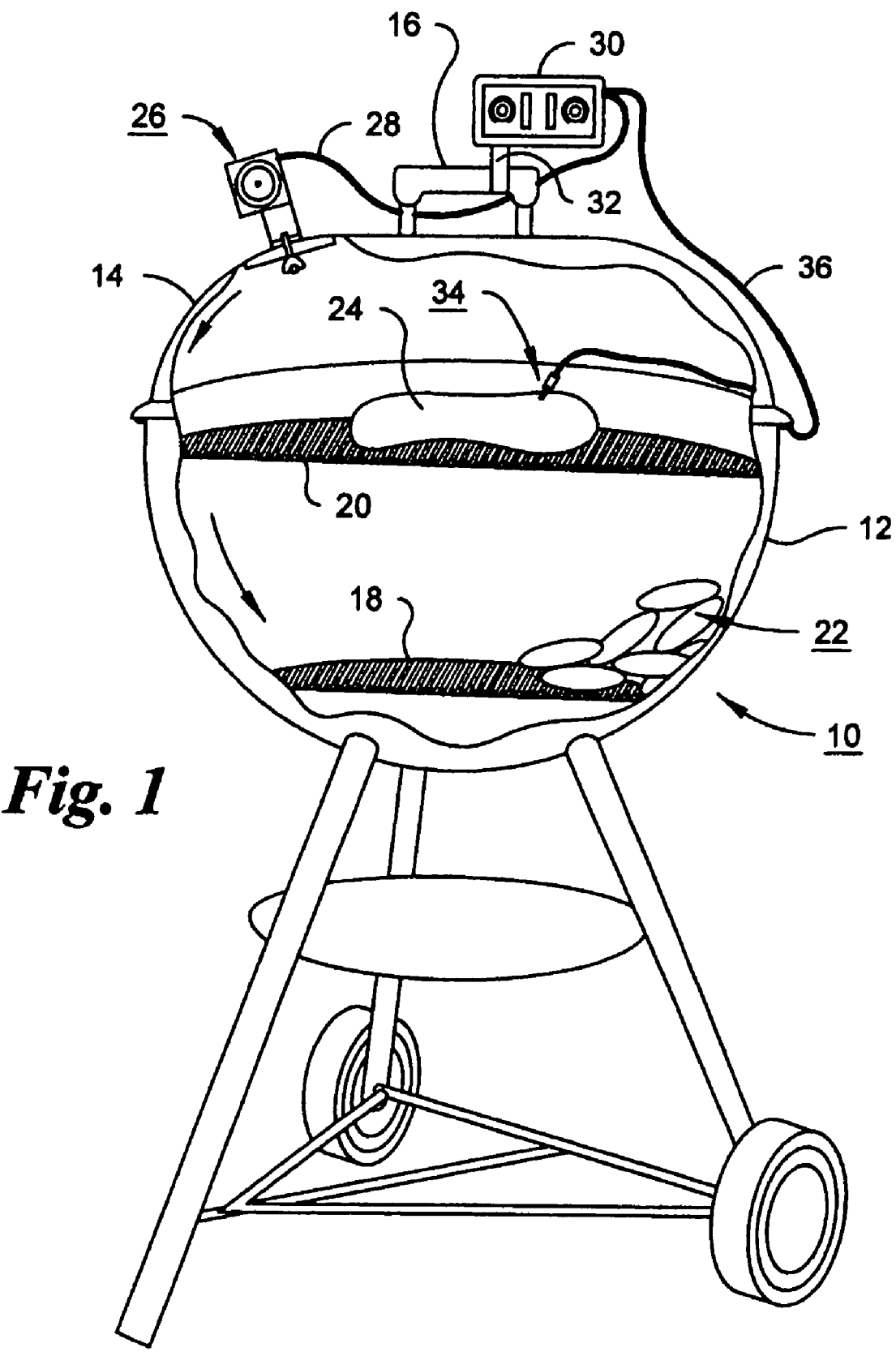
FIG. 1 is a schematic diagram of a cooking apparatus in accordance with the invention, in which the pit is a conventional kettle grill.

For the purpose of illustration, the invention will be described in detail with reference to an embodiment in which the pit is a conventional kettle grill 10, as shown in FIG. 1. The cooking enclosure of the pit comprises a hemispherical lower part 12, and a removable dome-shaped cover 14, having a handle 16.

A fuel supporting grate 18 is situated near the bottom of the lower part 12, and a food supporting grid 20 is situated above the fuel support.

When a pit of the type illustrated is used for conventional indirect cooking, the fuel, usually charcoal, is positioned so that it is laterally displaced from the food being cooked. Typically, the article of food is centered on the food supporting grid 20, and the charcoal is arranged in a circle near the edge of the fuel support 18. A water-filled pan (not shown) can be placed on the center of the fuel support 18 to catch fat, and to add moisture to the atmosphere inside the pit. In conventional indirect cooking, a damper (not shown), located at the bottom of the lower part 12 of the pit is partly opened, and a damper in the lid is also partly opened so that a convection current is established inside the pit.

The same arrangement of food and fuel can be used in accordance with this invention. However, since a smaller amount of charcoal can be used, the briquettes 22 can be positioned to one side of the fuel supporting grate 18, as shown in FIG. 1, and the article of food 24, for example a large cut of meat such as a pork shoulder, can be positioned either in the center of the food support grid 20, or to one side of the food support grid so that the food is not directly above the fuel. The lower damper or the upper damper, or both, are preferably fully closed in order to avoid convection. Air flow within the cooking chamber is preferably substantially entirely under the control of an impeller assembly 26, which is mounted on the exterior of the pit. In the embodiment illustrated, the impeller assembly 26 is mounted on the dome-shaped cover 14. However, as an alternative, the impeller assembly can be mounted on the exterior of the lower part 12 of the pit. As shown in FIG. 1, the impeller assembly 26 is connected by electrical wiring 28 to a control unit 30, which is mounted by a bracket 32 on handle 16. A thermal probe 34, a part of which penetrates the food article 24, is connected to the control unit 30 by a electrical leads in a cable 36, which extends through a small space between the cover 14 and the rim of the lower part 12 of the pit.

Figure 2:
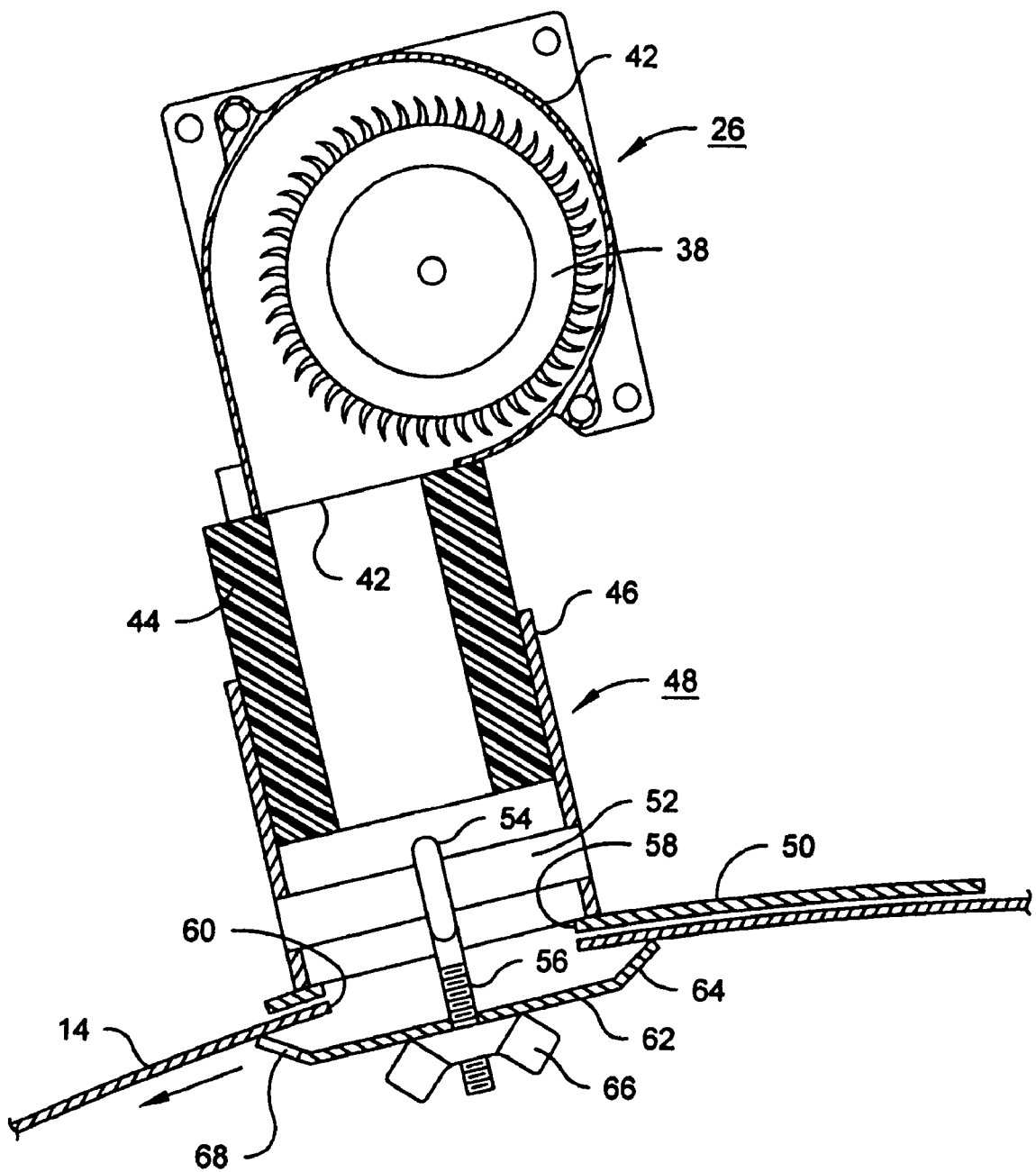
FIG. 2 is a sectional view of an impeller and motor assembly, illustrating the manner in which the assembly is attached to the pit, and also illustrating an air deflector.

The impeller assembly, which is shown in section in FIG. 2, comprises a vaned rotor 38 driven by an electric motor (not shown) through a shaft 40. The rotor is mounted in a housing 42, which is in the form of a conventional centrifugal blower housing having an axial air intake opening (not shown) and an air outlet opening 42, the axis of which is tangent to the rotor. A tube 44 attached to the impeller housing fits into a tube 46 of a mounting assembly 48. The tube is preferably composed of a thermally insulating material, such as poly (vinyl chloride), acrylonitrile-butadiene-styrene, etc., capable of withstanding the maximum temperature reached above the pit cover during cooking. The tube prevents damage to the impeller and motor due to overheating. Optionally, heat dissipating fins can be provided on tube 46.

In the mounting assembly 48, tube 46 extends upward from a plate 50, which conforms to the outer surface of the pit cover 14. A pin 52, which extends transversely across tube 46, is engaged by a hook 54 having a threaded shank 56. The shank extends through a hole 58 in plate 40, and through hole 60 formed in the pit cover 14 into the interior of the pit. A plate 62, having an upturned edge 64, is secured against the inside of the cover by a wingnut 66 threaded onto shank 56. The engagement of the wingnut with the plate and with the threaded shank of the hook holds the mounting assembly 48 in place on the pit cover.

The upturned edge 64 of the plate 62 has an opening 68 on one side. Since the edge 64 is in engagement with the inside of the cover except at the location of the opening 68, it serves as a deflector, directing the air which flows into the interior of the pit through holes 58 and 60, along the inside surface of the cover in the direction of the arrows shown in FIGS. 1 and 2. The flow of air through the opening 68 travels along the inside wall of the pit because of the Coanda effect, and produces a circulating flow within the interior of the pit. The deflector prevents the stream of air from reaching the temperature sensor before it reaches the briquettes. The circulating air contacts the briquettes 22, maintaining combustion, and carries hot gases generated by combustion of the briquettes upward and into contact with the food 24. Since the dampers of the pit are closed, the operation of the impeller generates a static pressure in the interior of the pit, which lifts the lid slightly, allowing spent air and smoke to escape through a small space between the lid and the upper edge of the lower part 12 of the pit.

The impeller mounting assembly can be mounted at any of various locations. Hole 60 can be punched in the pit cover, or in the lower part of the pit, at any convenient location. Alternatively, in a pit having a damper with one or more holes in its cover, the impeller assembly can be installed in one of the damper holes, thereby obviating the punching step. The remaining holes in a multiple hole damper can be closed by means of metal inserts. However, if the inlet damper in the bottom part of the pit is kept closed to avoid convective flow of external air into the pit through the inlet damper, the remaining damper holes of the multiple hole damper in the cover can be left open and used as exhaust ports.

Figure 3:
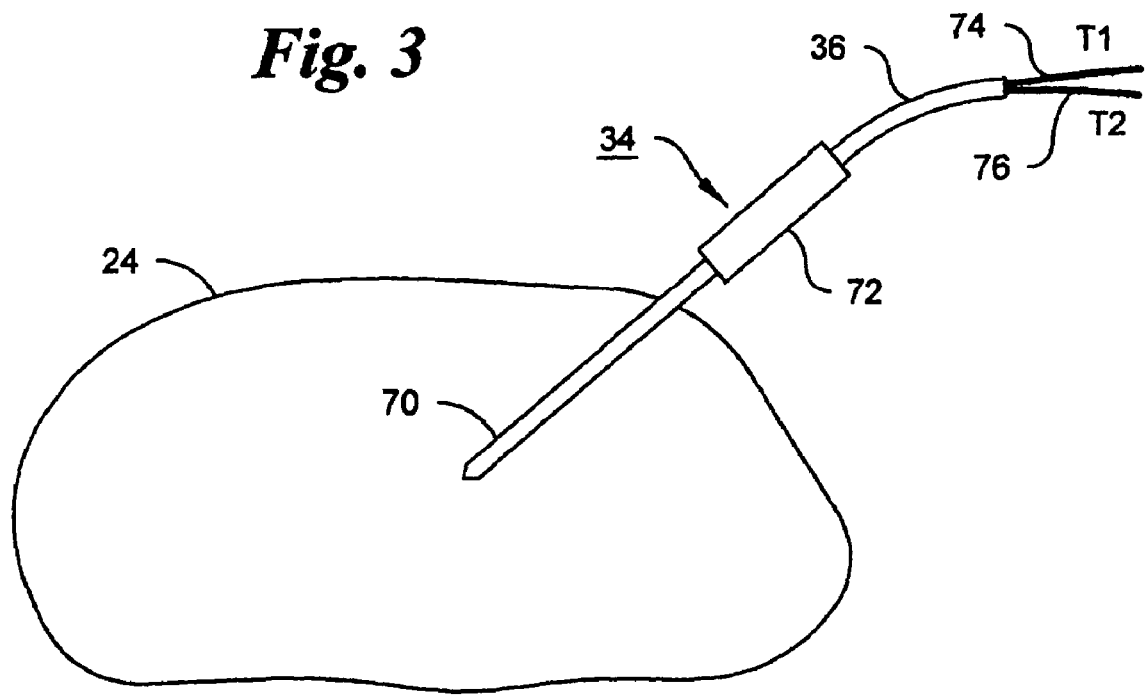
FIG. 3 is a schematic diagram showing the temperature sensors.

The control unit 30 (FIG. 1) receives input signals from temperature sensors in the probe 34. The temperature sensors are preferably thermocouples, one being located in the distal tip 70 of the probe 34, as shown in FIG. 3, and the other being located in a proximal part 72 of the probe. The probe is inserted into the food article 24, and the thermocouple in the tip of the probe responds to the internal temperature of the food while the other thermocouple responds to the temperature of the gas in the cooking chamber in the vicinity of the food article. The thermocouple deliver their outputs through pairs 74 and 76 of electrical leads inside cable 36.

Figure 4:
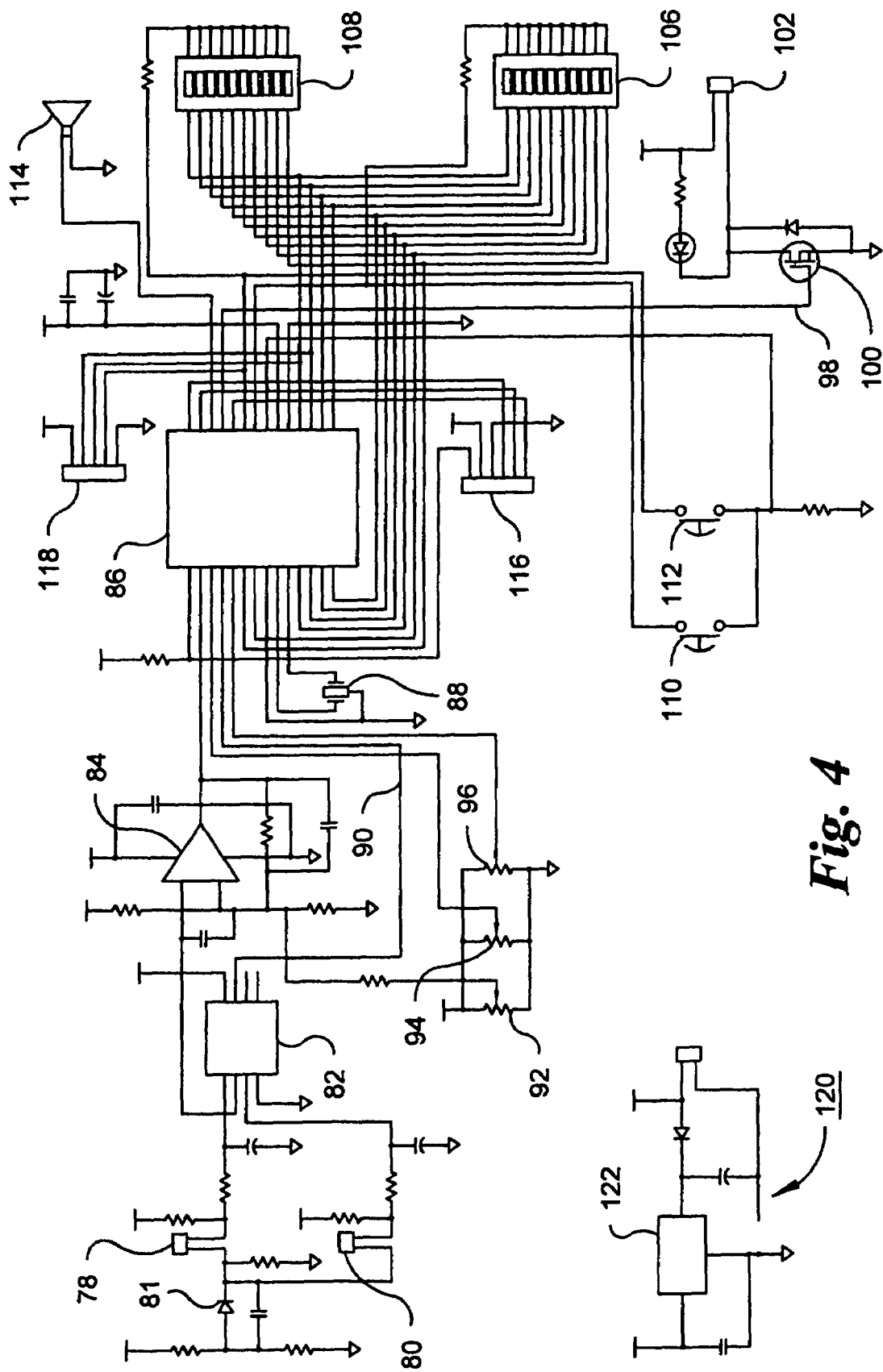
FIG. 4 is a schematic diagram of the control.

The control 30 is a two-input proportional temperature controller for alternately switching electrical power to the impeller motor on and off. As shown in FIG. 4, thermocouples 78 and 80 in the probe provide the inputs to the control circuit. These thermocouples are type T thermocouples. Such thermocouples can be used with or without linearization, and are used in this case without linearization. Cold junction compensation is accomplished by a diode sensor 81 located within the control enclosure. This diode sensor senses the temperature at the location at which the thermocouples are connected to the control circuit on a printed circuit board. The thermocouples are connected, by identical circuits, to two inputs of an analog switch module 82, used as a multiplexer. A suitable analog switch module is a Maxim MAX4541 analog switch available from Maxim Integrated Products of Dallas, Tex. The analog switch provides a time-divided, multiplexed, analog temperature signal to an operational amplifier 84, which can be a Linear Technology LT1006, precision, single supply, operational amplifier.

Operational amplifier 84, in turn, provides an output to a microcontroller 86, preferably a Microchip Technology, Inc. PIC16F876/873, 28 pin, 8-bit CMOS flash microcontroller. The microcontroller, which incorporates a clock oscillator regulated by a ceramic resonator 88, supplies a clock signal to the analog switch through line 90.

A preset offset voltage is supplied to the operational amplifier 84 by potentiometer 92. Potentiometer 94 supplies a meat temperature set point voltage to the microcontroller, and potentiometer 96 supplies a pit temperature set point voltage to the microcontroller. Potentiometers 94 and 96 are set manually by the operation of knobs on the front panel shown in FIG. 5.

An analog-to-digital converter, built into the microcontroller, converts the analog set point voltages, and the multiplexed temperature signals from the operational amplifier, to a digital format for processing.

An output signal from the microcontroller delivered through line 98 to the gate of field effect transistor 100, controls the operation of the impeller motor (not shown) which is connected to connector 102. A "power draft" indicating light-emitting diode 104 is connected to transistor 100, and illuminated when power is supplied to the motor. This light-emitting diode is located at the bottom of the front panel, as shown in FIG. 5.

LED bar indicators 106 and 108, shown in FIG. 4, are driven by the microcontroller to indicate meat and pit temperature, respectively. As shown in FIG. 5, the bar indicators are visible at the front panel. Pit temperature is indicated in degrees Farenheit, on a scale from 175° to 400°. Meat temperature, on the other hand, is indicated in terms of the difference between the measured meat temperature and the meat temperature set point, on a scale ranging from −40° F. to +5° F. When the temperature to be displayed by one of these LED bar indicators is outside its range, the microcontroller causes the uppermost or lowermost LED to blink.

Figure 5:
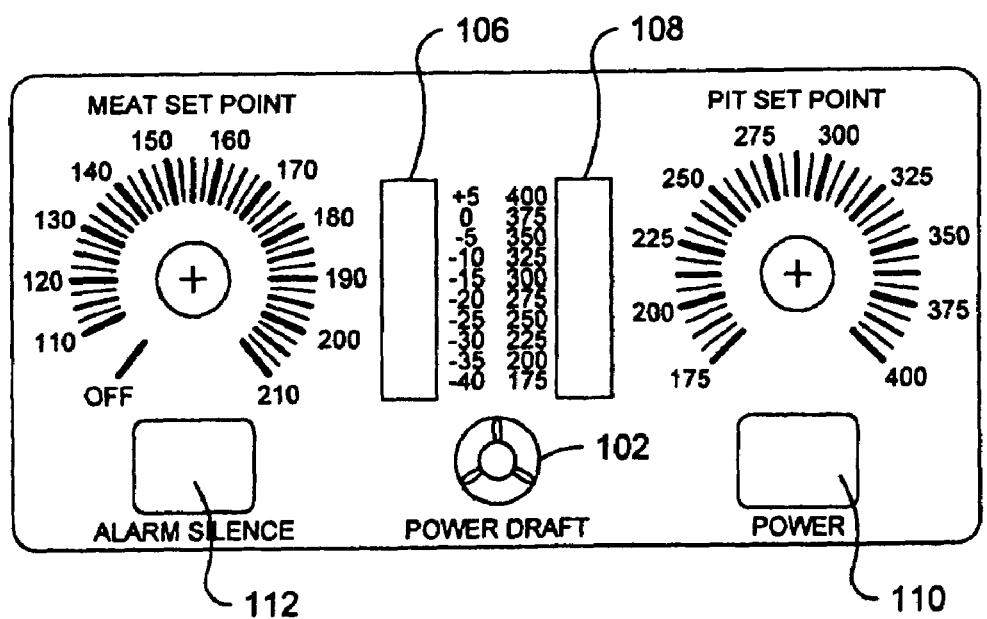
FIG. 5 is an elevational view of the control panel.

A power push-button 110 and an alarm silencing button 112 are connected to the microcontroller 86 as shown in FIG. 4, and available at the front panel, as shown in FIG. 5.

An alarm speaker 114 is also connected to be driven by the microcontroller. A microcontroller programming port is provided at 116, an output port 118 is provided for connection to a computer for testing, or for plotting or displaying temperature changes. A power supply circuit 120 delivers 12 VDC for operation of the impeller motor, and includes a regulator 122 to provide 5 VDC for operation of the control and monitoring circuitry.

Figure 6:
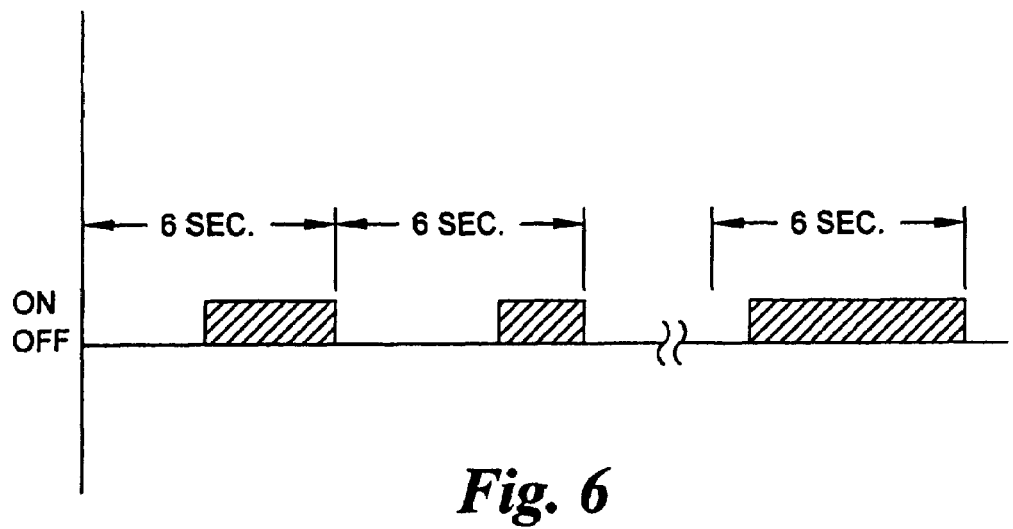
FIG. 6 is a plot illustrating the switching of electrical power to the impeller motor under different temperature conditions.

The microcontroller varies the flow of air into the interior of the pit by varying the duty cycle of the impeller, that is, the ratio of the time interval during which the impeller motor is operating to a longer time interval measured between successive instants at which the impeller motor is switched on (or between successive instants at which the impeller motor is switched off). The longer time interval is preferably, but not necessarily, a fixed interval, such as six seconds. For example, as depicted in FIG. 6, if the impeller motor is operating for an interval of three seconds, and the long interval is six seconds, then the duty cycle is 50%. If the impeller motor operates over an interval of two seconds, the duty cycle is approximately 33%. If the impeller operates over an interval of 5 seconds, the duty cycle is approximately 83%.

The control preferably has a temperature band of around 12° F. That is, if the sensed temperature of the gas in the vicinity of the article being cooked is 6 degrees above the set point, the impeller motor will not operate at all. If the sensed temperature is 6 degrees below the set point, the impeller motor will operate continuously. Within the 12° band, the duty cycle of the impeller will vary between 0% and 100%. The control can change the duty cycle in increments as small as 0.024%, if capable of a resolution of 12 bits. An offset can be added to the temperature band to compensate for any normal droop errors that occur in the cooking process.

The control is also responsive to the sensed internal temperature of the food article, and adjusts the set point accordingly. When cooking is begun, the fire should be relatively weak. For example, it is necessary for only a few briquettes to be ignited. This can be accomplished easily using a propane torch. The control is then set by selecting maximum pit temperature and a target temperature for the food. The maximum pit temperature is set, using the pit temperature control knob, which operates potentiometer 96. The target temperature is set by using the other control knob, which operates potentiometer 94. By way of example, the target temperature, that is, the desired final internal temperature of the food article being cooked might be set to 180° F., while the maximum pit temperature might be set to 300° F.

Initially, the set point is 300° F., and the controller will either maintain a long duty cycle, or operate the impeller motor continuously, until the pit temperature reaches 300°, at which time the duty cycle will be reduced in order to maintain the pit temperature within the range of 294° to 306°. In this way, the temperature of the food is rapidly brought up to a relatively high level, but still below the desired target temperature. The 300° set point will be maintained until the internal temperature of the food reaches a level that is below the food target temperature by a predetermined fixed amount. For example, the 300° set point can be maintained until the internal temperature of the food reaches 150° F., which is 30° below the 180° F. target temperature. When the food temperature reaches this level, the control will begin to reduce the pit temperature set point gradually downward from the maximum of 300° toward a level that is about 30° above the food target temperature, i.e., a level of about 210° F. The set point will ramp downward from 300° toward 210° at a rate depending on the sensed internal temperature of the food.

Thus, the microcontroller may be programmed to implement a slow downward ramp in the pit temperature in accordance with the equation:

$$PS = PSK \times \frac{MD + 30}{-30} + \left[\frac{MD + 30}{30}(MS + LS)\right]$$

where:
PS is the pit temperature setting called for by the microcontroller;
PSK is the setting of the pit temperature knob;
MD is the meat setpoint deviation, that is, the difference between the actual internal meat temperature as measured by the probe thermocouple 78 and the setting of the meat temperature knob;
MS is the setting of the meat temperature knob, i.e., the meat target temperature; and
LS is a preset constant, typically 30.

The microcontroller is programmed so that it only becomes operative to implement the above ramp equation when the internal meat temperature rises to a level within 30 degrees of the meat temperature setting MS. When the internal temperature of the meat is below that level, PS=PSK. That is, the microcontroller calls for a pit temperature equal to the temperature set on the pit temperature knob.

As will be apparent, from the equation, after the internal temperature of the meat rises to within 30 degrees of the target temperature, the pit temperature called for by the microcontroller slowly ramps downward while the internal temperature of the meat continues to rise toward the target temperature. For example, if MD is −30°, PS will be 300°. If MD is −20°, PS will be 270°. If MD is −10°, PS will be 240°. If MD is 0°, PS will be 210°.

Figure 7:
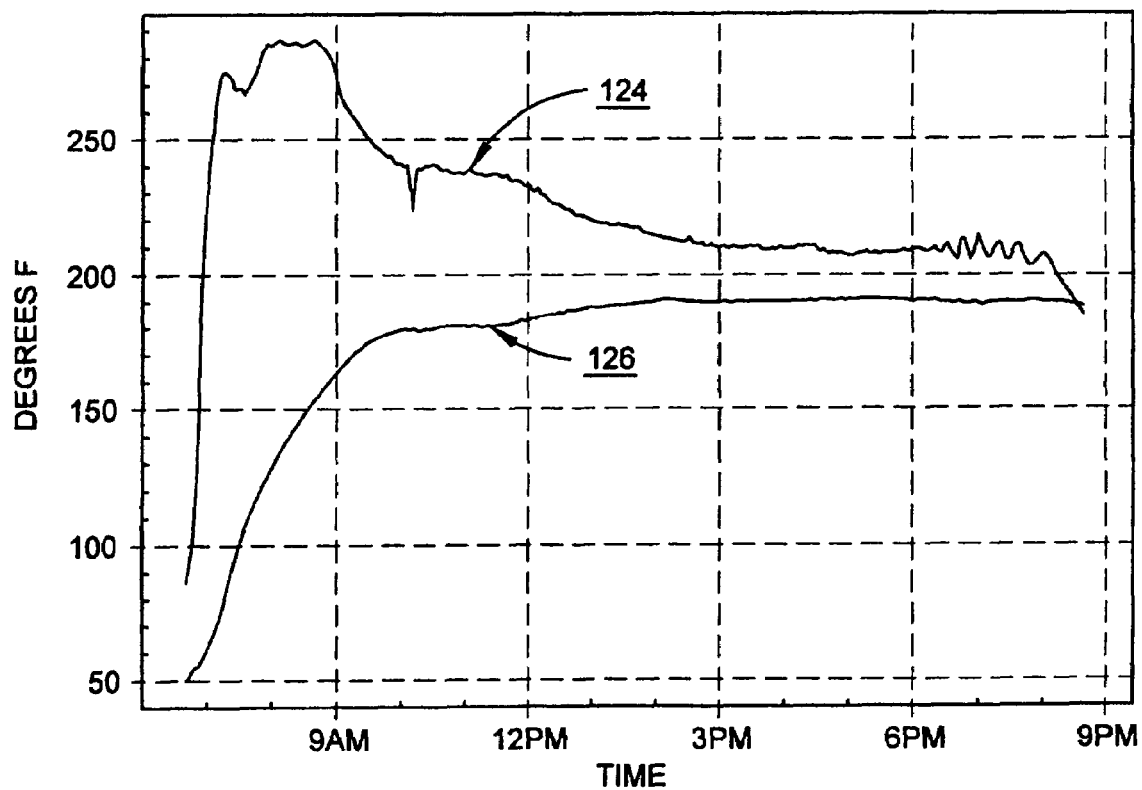
FIG. 7 is a plot of temperature against time, illustrating a typical cooking cycle.

FIG. 7 depicts the actual internal meat temperature of a beef brisket, and the actual pit temperature over a cooking time of approximately 14 hours. The pit temperature, as shown by curve 124, rose rapidly because the air impeller operated continuously. The pit temperature continued to rise rapidly and leveled off at approximately 270° F.-280° F., just below the 300° F. pit temperature set point. The meat temperature, depicted by curve 126, initially rose rapidly due to the high pit temperature.

The meat target temperature was approximately 180° F. The meat temperature reached approximately 150° F., that is, 30° below the target temperature, at about 8:30 AM. At that time, the microcontroller began to reduce the pit set point gradually, by shortening the impeller duty cycle. As shown in FIG. 7, the gradual reduction of the pit temperature set point, caused the pit temperature to drop gradually, approaching 210° F., which is approximately 30° above the meat target temperature. The reduction in the pit temperature reduced the rate of cooking of the meat, allowing the meat to approach the target temperature gradually over a long period of time, in this case about nine hours. The microcontroller caused the alarm to sound before 6:00 PM, but, because the pit temperature exceeded the meat target temperature by only 30°, cooking could continue for several more hours without any adverse effect.

The entire cooking operation took place on a single charge of charcoal. At approximately 6:30 PM, the charcoal was nearly completely burned, and the pit temperature began to drop below the 210° F. minimum set point established by the microcontroller. When this occurred, the microcontroller, began to increase the impeller duty cycle, as depicted on the right of FIG. 5. This caused the pit temperature, and the impeller duty cycle to fluctuate over a period of about two hours, from 6:30 PM to 8:30 PM, until the charcoal was completely exhausted.

The controller includes two alarms, the alarm indicating that the meat target temperature has been reached, and a pit temperature alarm, set to sound when the pit temperature is either above or below the pit set point by a predetermined amount, e.g. 30°. The operation of the alarm is suppressed by the microcontroller when the pit is cold so that the alarm does not sound when cooking is begun. The alarm can be silenced by momentary depression of the alarm silencing push-button 112 (FIG. 4).

As mentioned previously, the invention can be embodied in any of many different kinds of barbeque pits. Numerous modifications can be made to the apparatus. For example, the impeller structure can be attached to the lower part of the pit rather than to the cover. The ramp formula, relating the pit temperature as set by the control to the meat temperature, can be varied to meet any desired performance requirements. The formula can be varied by reprogramming the microcontroller. The electronic control, although preferably digital, can be embodied in an analog circuit. Moreover, although air flow in the pit is preferably controlled by operating the impeller intermittently, as an alternative, the impeller can be operated continuously, but with its speed varied in response to sensed temperatures.

As mentioned previously, the apparatus does not require constant attention by the cook. Accordingly the cook can be at a remote location. A radio transmitter, of the kind used as a baby monitor, can be incorporated into the alarm to alert the cook, when the target temperature is reached, or in the event that the pit temperature is either too high or too low. In another modification, the controller can be connected to the pit by a wireless link, allowing the user not only to monitor, but also control, pit operation from a nearby, but remote, location. With a wireless link, the user can also conveniently utilize a personal computer as the control device. Moreover, when a personal computer is utilized in this manner, the operation of the pit can be controlled and monitored from any location, using a communications network.

In another modification, a mechanical damper can be provided either at the inlet or outlet side of the impeller to provide further control of the temperature inside the pit. The damper may be used, for example, to maintain a very low temperature in order to smoke cheese. The damper is preferably provided on the outlet side of the impeller so that it can be closed completely after cooking is finished. This way, if the pit is opened to remove the cooked food, and then reclosed while the coals are still hot, even though the hot coals will heat the air inside the pit and cause it to expand, the damper will prevent the hot air from flowing outward through the impeller mechanism and causing damage.

Still other modifications may be made to the apparatus and method described above without departing from the scope of the invention as defined in the following claims.

The invention claimed is:

1. Cooking apparatus comprising:
an enclosure having a food support for an article of food to be cooked, and a fuel support for solid fuel, the supports being having food supporting and fuel supporting areas respectively, said areas being displaced from each other sufficiently that cooking of a food article on said food supporting area by fuel on said fuel supporting area can take place, at least in substantial part, as a result of contact between said food article and hot gas produced by combustion of said fuel;
an inlet opening for flow of air into the enclosure;
an impeller arranged to cause air to flow, through said inlet opening, from the exterior of said enclosure into the interior thereof, and to impinge upon solid fuel on said fuel supporting area;
an electric motor arranged to operate the impeller;
a first temperature sensor for sensing the temperature of the atmosphere within said enclosure in the vicinity of an article of food on said food support, and providing a first output signal;
a second temperature sensor for sensing the internal temperature of a food article on said food support and providing a second output signal; and
a programmed controller, responsive to said first output signal, for controlling operation of said electric motor, said controller being programmed to cause the impeller to increase the flow of air into the interior of said enclosure with decreasing temperature of said atmosphere and to decrease said flow of air with increasing temperature of said atmosphere, whereby said atmosphere is maintained substantially at a set point temperature;
said controller being also programmed to respond to said second output signal to reduce said set point temperature as the internal temperature of said food article increases, and to regulate, over an interval of time, the rate at which the set point temperature is reduced in dependence on the internal temperature of said food article as sensed by said second temperature sensor, said interval of time beginning with a time at which the internal temperature of said food article reaches a predetermined level;
in which said controller includes a manually operable adjuster for setting a target temperature for the internal temperature of the food article, and is programmed to cause said set point temperature gradually to approach a temperature level exceeding said target temperature by a predetermined amount and to hold the temperature of the atmosphere within said enclosure at least at said temperature level until fuel on said fuel support is no longer able to maintain said temperature level.

2. Cooking apparatus according to claim 1, in which said controller includes a second manually operable adjuster for setting a maximum temperature for said atmosphere within said enclosure.

3. Cooking apparatus according to claim 1, in which said enclosure has an internal wall, and including a deflector for directing a stream of air from said impeller along said internal wall toward said fuel supporting area, whereby said stream of air is prevented from reaching said first temperature sensor before said stream of air reaches fuel on said fuel supporting area.

4. Cooking apparatus according to claim 1, in which said controller controls said flow of air by alternately switching electrical power to said electric motor on and off, and causes the impeller to increase and decrease said flow of air by varying the duty cycle of said electric motor.

5. Cooking apparatus according to claim 1, in which said controller controls said flow of air by establishing sequentially repeating fixed intervals of time, and alternately switching electrical power to said electric motor on once and off once in each such fixed interval of time, and causes the impeller to increase and decrease said flow of air by varying the proportion of each such fixed interval of time during which electrical power to said electric motor is switched on.

6. Cooking apparatus according to claim 1, in which, when said enclosure is closed and fuel on said fuel support is in combustion, the only opening in said enclosure through which substantial amounts of external air can flow to said fuel supporting area is said inlet opening.

7. Cooking apparatus according to claim 1, in which said predetermined level of the temperature of said food article is a temperature below said target temperature and differs by the same predetermined amount from the target temperature as set by said manually operable adjuster for any setting of said manually operable adjuster.

8. Cooking apparatus according to claim 1, wherein said predetermined amount by which said temperature level exceeds said target temperature is a fixed amount independent of the target temperature.

9. Cooking apparatus comprising:
an enclosure having a food support and a solid fuel support;
an inlet opening for flow of air into the enclosure;
an impeller arranged to cause air to flow into the enclosure through said inlet opening and impinge upon solid fuel on said solid fuel support;
a first temperature sensor for sensing the temperature of the atmosphere within said enclosure in the vicinity of an article of food on said food support;
a second temperature sensor for sensing the internal temperature of said article of food on said food support; and
a programmed controller programmed to respond to said first temperature and said second temperature sensor, for operating said impeller and causing the flow of air toward said solid fuel to maintain the temperature of said atmosphere within said enclosure substantially at a set point determined by the internal temperature sensed by said second temperature sensor, and, to regulate the operation of said impeller over an interval of time, thereby reducing said set point as said internal temperature increases, at a rate depending on the internal temperature of said food article as sensed by said second temperature sensor, said interval of time beginning with a time at which the internal temperature of said food article reaches a predetermined level;
in which said controller includes a manually operable adjuster for setting a target temperature for the internal temperature of the food article, and is programmed to cause said set point temperature gradually to approach a temperature level exceeding said target temperature by a predetermined amount and to hold the temperature of the atmosphere within said enclosure at least at said temperature level until fuel on said fuel support is no longer able to maintain said temperature level.

10. Cooking apparatus according to claim 9, in which said controller includes a second manually operable adjuster for setting a maximum temperature for said atmosphere within said enclosure.

11. Cooking apparatus according to claim 9, in which said enclosure has an internal wall, and including a deflector for directing a stream of air from said impeller along said internal wall toward said fuel supporting area, whereby said stream of air is prevented from reaching said first temperature sensor before it reaches fuel on said fuel support.

12. Cooking apparatus according to claim 9, in which said controller controls said flow of air by operating said impeller intermittently.

13. Cooking apparatus according to claim 9, in which said controller controls said flow of air by establishing sequentially repeating fixed intervals of time, and operating said impeller intermittently during a portion of each said fixed interval of time, and causing the impeller to increase and decrease said flow of air by varying the proportion of each such fixed interval of time during which impeller is operated.

14. Cooking apparatus according to claim 9, in which when said enclosure is closed and fuel on said fuel support is in combustion, the only opening in said enclosure through which substantial amounts of external air can flow to said fuel supporting area is said inlet opening.

15. Cooking apparatus according to claim 9, in which said predetermined level of the temperature of said food article is a temperature below said target temperature and differs by the same predetermined amount from the target temperature as set by said manually operable adjuster for any setting of said manually operable adjuster.

16. Cooking apparatus according to claim 9, wherein said predetermined amount by which said temperature level exceeds said target temperature is a fixed amount independent of the target temperature.

* * * * *

UNITED STATES PATENT AND TRADEMARK OFFICE
CERTIFICATE OF CORRECTION

PATENT NO.         : 7,516,692 B2
APPLICATION NO.    : 10/781174
DATED              : April 14, 2009
INVENTOR(S)        : Fred L. Pirkle and Damian Coccio It is certified that error appears in the above-identified patent and that said Letters Patent is hereby corrected as shown below:

Column 9, line 22, delete "being".

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,516,692 B2 | Page 1 of 1 |
| APPLICATION NO. | : 10/781174 | |
| DATED | : April 14, 2009 | |
| INVENTOR(S) | : Pirkle et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1086 days.

Signed and Sealed this

Seventh Day of September, 2010

David J. Kappos
*Director of the United States Patent and Trademark Office*